US009281858B2

(12) United States Patent
Fathollahi (10) Patent No.: US 9,281,858 B2
(45) Date of Patent: Mar. 8, 2016

(54) CO-MOLDED MULTI-LAYERED PROTECTIVE CASE FOR MOBILE DEVICE

(71) Applicant: Incipio Technologies, Inc., Irvine, CA (US)

(72) Inventor: Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 14/585,148

(22) Filed: Dec. 29, 2014

(65) Prior Publication Data
US 2015/0194995 A1 Jul. 9, 2015

Related U.S. Application Data

(60) Provisional application No. 61/923,631, filed on Jan. 3, 2014.

(51) Int. Cl.
| H04M 1/00 | (2006.01) |
| H04B 1/38 | (2015.01) |
| H04B 1/3888 | (2015.01) |
| A45C 11/00 | (2006.01) |

(52) U.S. Cl.
CPC .............. *H04B 1/3888* (2013.01); *A45C 11/00* (2013.01); *A45C 2011/002* (2013.01)

(58) Field of Classification Search
CPC .................................................... H04B 1/3888
USPC ................................ 455/575.8, 575.4, 550.1
See application file for complete search history.

(56) References Cited

U.S. PATENT DOCUMENTS

| 8,599,547 | B2 * | 12/2013 | Richardson | G06F 1/1626 345/173 |
| 8,624,111 | B2 * | 1/2014 | Tages | B29C 45/1676 174/50 |
| 8,640,868 | B2 * | 2/2014 | O'Dowd | G06F 1/1628 206/320 |
| 8,989,826 | B1 * | 3/2015 | Connolly | A45C 1/06 361/679.01 |
| 9,025,948 | B2 * | 5/2015 | Tages | G03B 17/02 206/316.2 |
| 2013/0296004 | A1 * | 11/2013 | Tages | H05K 5/03 455/575.8 |
| 2014/0066142 | A1 * | 3/2014 | Gipson | H04B 1/3888 455/575.8 |
| 2014/0128132 | A1 * | 5/2014 | Cox, III | H04B 1/3888 455/575.8 |

OTHER PUBLICATIONS

Nick Guy, "Review: Incipio Phenom for iPhone 5c," Oct. 9, 2013, http://www.ilounge.com/index.php/reviews/entry/incipio-phenom-for-iphone-5c.

* cited by examiner

*Primary Examiner* — Tilahun B Gesesse
(74) *Attorney, Agent, or Firm* — Manatt, Phelps & Phillips, LLP (57) ABSTRACT

A protective case for a mobile device having a multi-layered construction is disclosed. The multi-layered construction includes three layers that are co-molded to one another and is capable of being lightweight and low-profile, yet provide a high level of impact protection. The first layer generally forms the external back face surface of the case, the third layer generally forms the perimeter bumper of the case and the second layer forms the internal liner of the case and includes an elevated pattern of walls upon which the back face of the mobile device rest upon. The first layer is comprised of material that has a hardness greater than the other two layers. The third layer is comprised of a material that has a hardness that is greater than the second layer. The layers are configured to interact with one another so that they are capable of distributing and absorbing impact forces to mitigate damage to the mobile device.

21 Claims, 7 Drawing Sheets

Thickness of Corner Protrusion

FIG. 3

Width of Corner Protrusion

CO-MOLDED MULTI-LAYERED PROTECTIVE CASE FOR MOBILE DEVICE

INCORPORATION BY REFERENCE TO RELATED APPLICATIONS

This application claims benefit under 35 U.S.C. §119(e) from U.S. Provisional Application No. 61/923,631, filed on Jan. 3, 2014, the disclosure of which is incorporated herein by reference in its entirety.

BACKGROUND OF THE INVENTION

1. Field of the Invention

This patent document relates to user removable protective enclosures or cases for mobile devices and more particularly to such cases that have a unique integrated multi-layered construction.

2. Description of the Related Art

Mobile devices, such as smart phones, tablets, laptops and the like are known to sustain damage from impact and from contamination as a result of ingress of water or other fluid. The damage, for example, may result in a cracked screen, scratches on a finished surface, lost or damaged buttons or controls, cracked or bent external body components, and/or failed or malfunctioning electrical components. Protective cases have thus been provided to protect mobile devices from such and variant types of damage.

The bulkiness and weight of the protective case can be an issue for consumers. Thick and heavy cases, while capable of providing improved protection, are contrary to the very utilitarian qualities of mobility (lightweight and small size) that makes such mobile devices so attractive to consumers. Indeed many users carry their devices in their front or back pant pockets. Even a relatively modest increase in bulk or weight can, therefore, be more noticeable, uncomfortable, and less desirable.

Accordingly, it is here recognized that there is a continuing and an ever increasing desire to minimize the bulkiness and weight of protective cases for mobile devices yet maintain a high level of protection.

SUMMARY OF THE INVENTION

There exists a continuing need for new and improved designs for protective cases for mobile devices that provide high level of protection, yet are low profile.

Disclosed are numerous aspects of a unique and inventive protective case configured to receive, retain and protect a mobile device that includes a front face and a back face that define the height of the mobile device, a perimeter defined by top-end, bottom-end, right, and left sides residing between the front and back faces, and corners defined at the intersecting regions of the sides. The case may be for a mobile device that is in the form of a tablet, a mobile phone, an MP3 audio player, a gaming device, or other portable handheld electronic device and may have one or more touchscreens, including on its front face and/or back face.

The case may be formed of multilayered construction that includes three layers, various aspects of which are described. The first layer is defined by inner and outer surfaces and dimensioned to cover a portion of the back face of the mobile device and/or extend around a portion of the perimeter of the mobile device at the back face boundary. The inner surface of the first layer includes a plurality of protrusions that extend in a direction generally away from the outer surface.

The second layer is defined by inner and outer surfaces and also dimensioned to cover a portion of the back face of the mobile device and extend around a portion of the perimeter of the mobile device at the back face boundary. The second layer may further include a plurality of corner protrusions positioned along the perimeter region of the second layer to correspond in location with the corners of the mobile device. The second layer may further include an elevated pattern of interconnected walls extending from its inner surface a height above and in a direction away or opposite from the second layer's outer surface. The second layer further includes a plurality of apertures extending into its outer surface that surround (e.g., in close and firm proximity or contact with) one or more of the protrusions of first group of protrusions of the first layer. The second and/or first layers may each be configured to cover the entire, a majority, half or less than half of the back face of the mobile device and may be configured to extend around the entire, a majority, half or less than half of the perimeter of the mobile device at the back face boundary.

The third layer is similarly defined by third inner and outer surfaces and dimensioned to cover a portion of the top-end, bottom-end, right and/or left sides of the mobile device. The third layer may include one or more indentations in its inner surface at the corners. The indentations may be in the reverse image of, or otherwise dimensioned to receive, one or more of the corner protrusions of the second layer. The third layer may also include control apertures that are dimensioned and positioned to allow access to control buttons or ports on the mobile device.

The first, second, and third layers may be co-molded to form an integrated construction. The first layer may be made of a first material that has a first hardness, the second layer may be made of a second material that has a second hardness, and the third layer may be made of a third material that has a third hardness. The first hardness is greater than the third hardness, which in turn is greater than the second hardness.

For example, the first layer may have a Shore A durometer hardness that is 40% or more greater than the third layer, 30% or more greater than the third layer, 20% or more greater than the third layer, or 10% or more greater than the third layer all +/−5% as measured using the American Society for Testing and Materials (ASTM) standard D2240. The second layer may have a Shore A durometer hardness of 45+/−10, 45+/−5, or 45 as measured using the American Society for Testing and Materials (ASTM) standard D2240. The third layer may have a Shore A durometer hardness of 65+/−10, 65+/−5, or 65 as measured using the American Society for Testing and Materials (ASTM) standard D2240. The third layer may also, for example, have a Shore A durometer hardness that is 40% or more greater than the second layer, 30% or more greater than the second layer, 20% or more greater than the second layer, or 10% or more greater than the second layer all +/−5% as measured using the American Society for Testing and Materials (ASTM) standard D2240.

The first, second and third layers may be formed of a composition comprised of one or more materials including but not limited to polycarbonate (PC); thermoplastic urethane (TPU), thermoplastic elastomer (TPE), acrylonitrile butadiene styrene (ABS), nylon, metal, silicone rubber, or any combination thereof. For example, the first layer, which is the hardest of the three layers, may be formed of a composition comprised of polycarbonate, a combination of polycarbonate and ABS, nylon, fiber reinforced plastic, and/or metal. The second layer, which is the softest of the three layers, may be formed for example of a composition comprised of TPE, silicone rubber, or combination thereof or other suitable materials. The third layer, which has a hardness between the other two layers, may be formed for example of a composition that has a relatively high resistance to scratching such as a composition comprised of TPU and/or TPE or combination thereof or other suitable material.

Thus it is contemplated that in operation, when there is an impact at the corners, the third layer, which has a high resistance to scratching and a higher hardness than the second layer, distributes the force and to the extent the energy of the force is transferred to the second layer, the second layer can dampen the shock, especially at the impact prone corners, to thereby mitigate the transfer of the impact energy to the device.

One or more of the plurality of protrusions of the first layer may have a first external shape selected from a group consisting of a square, octagon, pentagon, rectangle, triangle, circle, hexagon, and heptagon. Also one or more of the plurality of protrusions may include an aperture residing within the protrusion that defines a first shape selected from a group consisting of a square, octagon, pentagon, rectangle, triangle, circle, hexagon, and heptagon. Also, the plurality of protrusions in the first layer may be dimensioned to be below, above, or flush with the height of the walls of the second layer that surround the protrusions. Thus, some of the plurality of protrusions in the first layer may be dimensioned to be flush with the height of the interconnected walls in the second layer adjacent thereto, some of the plurality of protrusions may be dimensioned to be below the height of the interconnected walls adjacent thereto, and some of the plurality of protrusions may be dimensioned to be above the height of the interconnected walls adjacent thereto. The plurality of protrusions may be comprised of multiple groups of protrusions with each protrusion in each group being equally or unequally spaced from one another or spaced in a defined pattern. The plurality of protrusions may be comprised of a first group configured to reside nearer the top end or side than the bottom end or side, a second group may be configured to reside nearer the bottom end or side than the top end or side, and a third group may be configured to reside an equal distance from the right and left sides.

The number of corner protrusions in the second layer may be two, three, four or more (depending on the number of corners on the mobile device), each of which is configured to reside at one, some or all of the corners of the mobile device or any combination of corners thereof. For example, one corner protrusion may be configured to reside at a corner defined in part by the top side of the mobile device and another corner protrusion may be configured to reside at a corner defined in part by the bottom side. By way of another example, one corner protrusion may be configured to reside at a corner defined in part by the right side of the mobile device and another corner protrusion may be configured to reside at a corner defined in part by the left side of the mobile device. By way of yet another example, a first corner protrusion may be configured to reside at a corner defined in part by the top side of the mobile device (e.g., the intersection between the top side and the right or left side), a second corner protrusion may be configured to reside at a corner defined in part by the bottom side (e.g., the intersection between the bottom side and the right or left side), a third corner protrusion may be configured to reside at a corner defined in part by the right side (e.g., the intersection between the right side and the top or bottom side), and a fourth corner protrusion may be configured to reside at a corner defined in part by the left side (e.g., the intersection between the left side and the top or bottom side). Correspondingly dimensioned corner indentations in the inner surface of the third layer may be provided to engagingly surround or receive one, some or all of the corner protrusions. Thus, some or all of the surfaces that define the indentions on the third layer may be in contact with a corresponding corner protrusion on the second layer.

The corner protrusions may be configured or dimensioned to reside above, below or flush with the height of the mobile device in any combination. For example, one of the corner protrusions may be configured to extend above the height of the mobile device and another of the corner protrusions may be configured to be flush with the height of the mobile device. Alternatively, all of the corner protrusions may be configured to be flush with the height of the mobile device or may be configured to reside below the height of the mobile device. One or all of the corner protrusions may also have uniform or varying dimensions in width and thickness between the base and the apex of the protrusion. For example, the corner protrusions may include a thickness defined between the inner and outer surfaces that varies with the height of the protrusion, such as being thicker (or thinner) at the base of the corner protrusion as compared to the thickness nearer the apex of the corner protrusion. By way of another example, the width generally perpendicular to the thickness may be wider (or narrower) at the base of the corner protrusion as compared to width near the apex of the corner protrusion.

The pattern of elevated interconnected walls of the second layer may be comprised of any arrangement of shapes selected for example from a group consisting of a square, octagon, pentagon, rectangle, triangle, circle, hexagon and heptagon or combination thereof. By way of example, the interconnected walls may be comprised of walls that form hexagons or portions thereof, which together create a honeycomb wall pattern. The apertures in the second layer and the plurality of protrusions of the first layer may also be hexagonal in shape and dimensioned to closely or snugly fit or mate together, so that one, some or all six of the walls that form the mating hexagons are in contact with one another. The pattern of elevated interconnected walls may be contiguous or discontiguous, may or may not extend to the perimeter regions of the second layer, may be positioned in discrete regions, or may be spaced apart from one another. Various patterns comprising one or more shapes may be employed alone or in combination with other patterns, such that one region of the inner surface of the second layer may have one pattern and another region of the inner surface of the second layer may have another pattern. The elevated pattern of interconnected walls may be configured in height and construction so as to suspend the back face of the mobile device above the apertures defined by the interconnected walls so that the back face of the mobile device does not bottom-out on (or become in contact with) the recessed inner surface of the second layer. Although not depicted, a pattern of interconnected walls may also be employed on the inner surface of the third layer to create an air-suspension frame around the mobile device at the perimeter and front face regions of the mobile device as well as the one created by the second layer vis-à-vis the back face region.

The second layer may further comprise one or more button protrusions that are dimensioned and configured to extend within one or more of the control apertures of the third layer. Each button protrusion may or may not be co-molded to the perimeter of the control aperture to form an integrated region therewith and may be configured to reside above or over a user control button on the mobile device such as a volume, power, mute, or other user button.

The third layer may also include one or more stability tabs configured to extend underneath the back face of the mobile device. The inner surface of the tab may be in contact with the outer surface of the second layer, while the outer surface of the tab may be exposed externally. The tab may be received within an aperture on the first layer that opens to the perimeter. The aperture may be configured to reside nearer one end of the mobile device than the other and may be configured to reside nearer to one side of the mobile device than the other. Alternatively the aperture and tab may be configured to be centrally positioned relative to one or more sides of the mobile device.

The third layer may also be configured to include a retention rim positioned to reside over the perimeter region of the front face of the mobile device to retain the mobile device within the case. The retention rim may encircle a portion or the entire front face. For example the retention rim may be configured to extend along the top, bottom, left, or right sides of the mobile device or any combination thereof. It is contemplated for example that the rim extend only in the corner regions or regions other than in the corners, or combination of corner and non-corner regions, which may facilitate insertion and removal of the mobile device from the phone. In this respect, the case is configured and constructed with sufficient flexibility to allow the user to install and remove the mobile device within the case without damaging the case or the mobile device.

The second layer may include one or more apertures to allow for functionality and so as to facilitate the intended use of the mobile device. For example, the second layer may include a camera lens aperture that extends there through and is configured to reside around the outside of a camera lens window on the back face of the mobile device. The walls that define the apertures may extend through the first layer and may overlap the outer surface of the third layer. To the extent there is a touchscreen on the back face or other surface region of the mobile device, second and first layer may have an aperture to allow user interaction with that touchscreen.

Methods of manufacturing a protective case that includes one or more of the various foregoing aspects are also disclosed. Manufacturing steps may, for example, include:

(1) co-molding three distinct layers within a mold to form an integrated protective case construct.

(2) molding the first layer defined by first inner and outer surfaces and dimensioned to cover at least a portion of the back face of the mobile device and extend around at least a portion of the perimeter of the mobile device at the back face boundary. The first layer may be molded to include a first plurality of protrusions extending from its inner surface in a direction away from its outer surface and being molded of a material that is harder than each of the second and third layers.

(3) co-molding, around the perimeter regions of the first layer, the third layer defined by third inner and outer surfaces and dimensioned to cover one or more regions of the top, bottom, right and left sides of the mobile device. The third layer may be further molded to include one or more control apertures dimensioned and positioned to allow access to control buttons or ports on the mobile device. The third layer may be further molded to include indentations in its inner surface at regions configured to reside at the corners of the mobile device, the indentations being dimensioned to surround corner protrusions of the second the layer. The third layer may be molded of material that is harder than the second layer.

(4) co-molding, onto the inner surface of both the first and third layers, the second layer defined by second inner and outer surfaces and dimensioned to cover at least a portion of the back face of the mobile device and extend around at least a portion of the perimeter of the mobile device at the back face boundary. The second layer being molded to include a plurality of corner protrusions positioned along the perimeter region of the second layer to correspond in location with corners of the mobile device and dimensioned to extend at, below, or above the height of the mobile device (as measured thereat between the front and back faces). The second layer may be further molded to include a pattern of walls extending from its inner surface a height above and in a direction away from its outer surface. The pattern of walls may form any arrangement of shapes selected for example from a group consisting of a square, octagon, pentagon, rectangle, triangle, circle, hexagon and heptagon or combination thereof. The second layer may further include a plurality of apertures that surround and are in contact with one or more of the protrusions in the first layer.

The various configuration and construction aspects of the three component layers described above or otherwise herein (including as illustrated in the drawings) may be included in the molding process of the layer with any of the foregoing steps, or portions of any of the foregoing steps, in any combination without limitation.

Each of the foregoing and various aspects, together with those set forth in the claims and summarized above or otherwise disclosed herein, including the drawings, may be combined to form claims for a device, apparatus, system, method of manufacture, and/or use without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION OF THE PREFERRED EMBODIMENT

As summarized above and illustrated in the drawings, disclosed herein are various aspects of a protective case for a mobile device capable of minimizing bulkiness and weight, yet maintain a high level of protection. Many of those aspects are summarized above and illustrated in the drawings.

Commonly disclosed in FIGS. 1-6 is a protective enclosure or case 200 for a mobile device 100 that illustrate, by way of example, various configuration and construction aspects of the case. In this particular implementation, the case is configured for an Apple iPhone 5s mobile or smart phone device. It should be understood, however, that the case may be configured for any mobile device or electronic device, including but not limited to portable or cellular phones, PDAs, gaming devices, laptop computers or tablet devices.

As best depicted in FIGS. 1A-1F, the mobile device 100 includes front and back faces 110 and 120, and a left side 130, a right side 140 (hidden from view), a top side 150, and a bottom side 160 that together define the perimeter 170 of the mobile device 100. The front and back faces are flat and the sides have flat surfaces that extend between the front and back faces 110, 120 and the distance between the front and back faces 110, 120 define the height of the device 100. Corner regions 180 are defined at the curved regions where the sides intersect with one another. The front face 110 includes a touchscreen 112 user interface, a home button 114 with biometric sensor (surround the home button), speakers, a front facing camera, and proximity sensors 116, 117, and 118 (located at the top end region on the front face of the phone) that are not shown in the illustrations, but well known to one of ordinary skill in the art. The back face 120 includes a camera lens window 122, a flash 124, and a microphone 125 that are grouped together in the upper corner on the right side of the phone 100. The left side 130 includes volume control buttons 132 (hidden below the corresponding case + and − buttons) and ringer silent switch 134 that controls whether or not the phone is on silent mode. The top side 150 includes a depressible power button 152 (also hidden behind the corresponding power button 254 on the case). The bottom side 160 includes a headphone jack 162, microphone grill 164, and a data and charging port 166.

Generally, the protective case 200 includes front and back face walls 210 and 220 and left side and right side walls 230 and 240 and top side and bottom side walls 250 and 260. The side walls, 230, 240, 250, and 260 reside between the front and back faces. Each of the walls 210, 220, 230, 240, 250, and 260 are dimensioned to correspond in dimension to the front and back faces, and left, right, top and bottom sides 110, 120, 130, 140, 150, and 160 of the mobile device 100, respectively.

Figure 5:
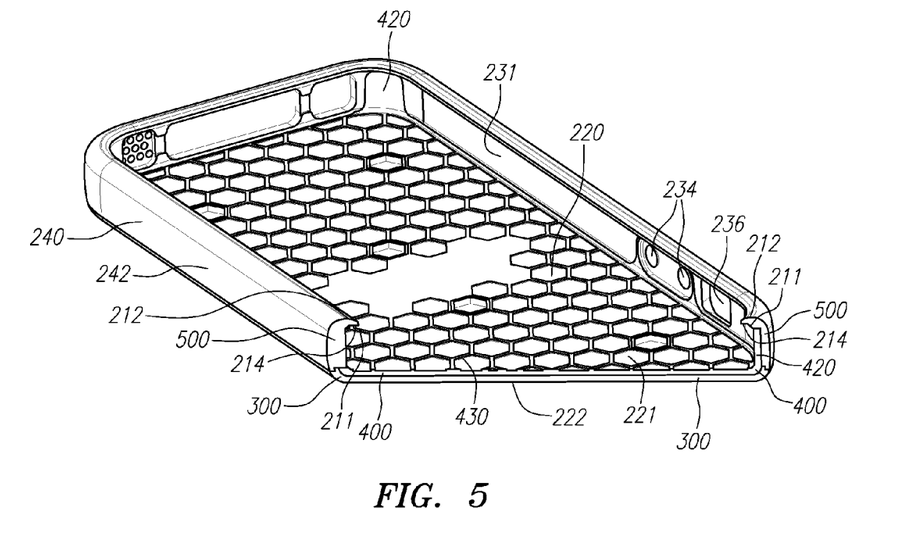
FIG. 5 is a more detailed cross-sectional view of the protective case illustrated in FIG. 2A taken along cross-section line C-C showing in greater detail the construction of the case and the relationship and configuration of the three integrated component layers.
Figure 6:
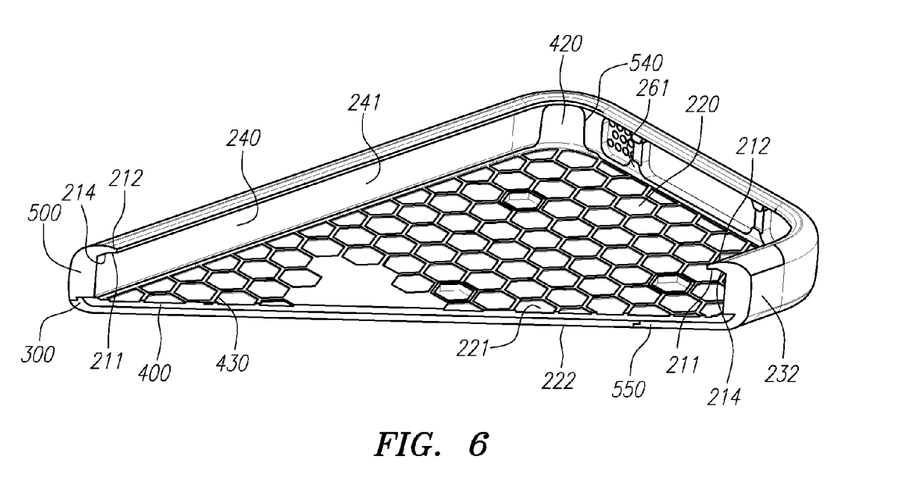
FIG. 6 is a more detailed cross-sectional view of the protective case illustrated in FIG. 2A taken along cross-section line D-D showing in greater detail the construction of the case and the relationship and configuration of the three integrated component layers.

More specifically, the front face wall 210 is defined by inner and outer surfaces 211 and 212 and includes an inwardly projecting rim 214 (best illustrated in the cross-sectional views of FIGS. 5 and 6). The back face wall 220 is also defined by inner and outer surfaces 221 and 222 and includes a camera lens and flash opening or aperture 224 extending there-through.

The left side and right side walls 230 and 240 are also each defined by inner and outer surfaces 231, 232 and 241, 242, respectively. The left side wall 230 further includes volume control buttons 234 that are positioned, dimensioned, configured and adapted to interface and actuate the volume control buttons 132 on the mobile device 100. Also included in the left side wall 230 is an opening or aperture 236 that is positioned and dimensioned to correspond with the ringer silent switch 134 of the mobile device 100 to provide functional user access to the switch 134. The right side wall 240 does not include any apertures or control buttons as none are provided on the Apple iPhone 5s mobile device for which the case is configured to protect. However, it is contemplated that it may include either apertures and/or buttons to provide access or control over corresponding ports or buttons on the mobile device should the device have controls or ports on that side. It should be understood however, that the number of apertures can vary (increase or decrease) and their placement vary to correspond with controls on the mobile device.

The top side and bottom side walls 250 and 260 are also each defined by inner and outer surfaces 251, 252 and 261, 262 respectively. The top side wall 250 includes a mobile device power button 254 positioned, dimensioned, configured, and adapted to interface with the power button 152 on the mobile device 100. In the implementation illustrated the button 254 resides within an aperture 255 and is connected thereto. For example, the button 254 may be connected in a levered manner 256 to top side wall 250 at one end or at a mid-section of the aperture 255, such that when pressed, the button 254 hinges around the lever connection. The bottom side wall 260 includes perforated regions 264 positioned and dimensioned to correspond with the microphone grill 164 regions on the mobile device 100. The bottom side wall 260 further includes a headphone jack and data/charging port apertures 266 and 267 that are positioned and dimensioned to correspond with the headphone jack port 162 and the data and charging port 166, respectively. Collectively the side walls 230, 240, 250 and 260 define a perimeter 270 between the front and back faces 210 and 220 of the protective case 200.

The case 200 is formed of a multilayered construction that includes three layers 300, 400 and 500 that are co-molded together to form a unitary integral construct. Various aspects of these layers and their inter-relationship, construction and manufacture are described in more detail.

Figure 1A:
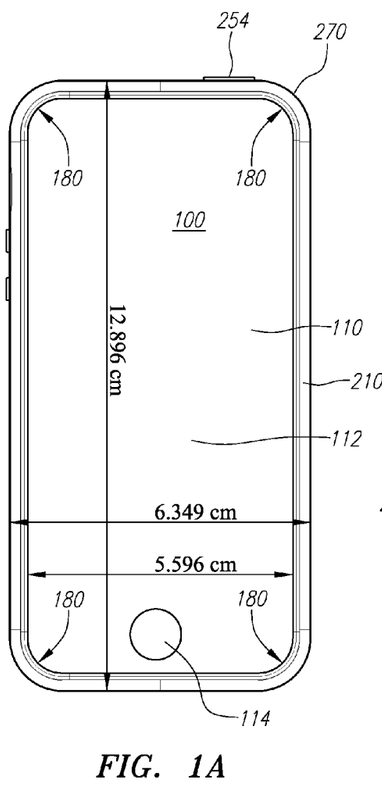
FIGS. 1A-1F are front face, back face, left side, right side, top side and bottom side views of a protective case for a mobile device with the mobile device received within the case. The mobile device depicted in the illustration is a depiction of an Apple iPhone 5s® mobile phone.
Figure 1B:
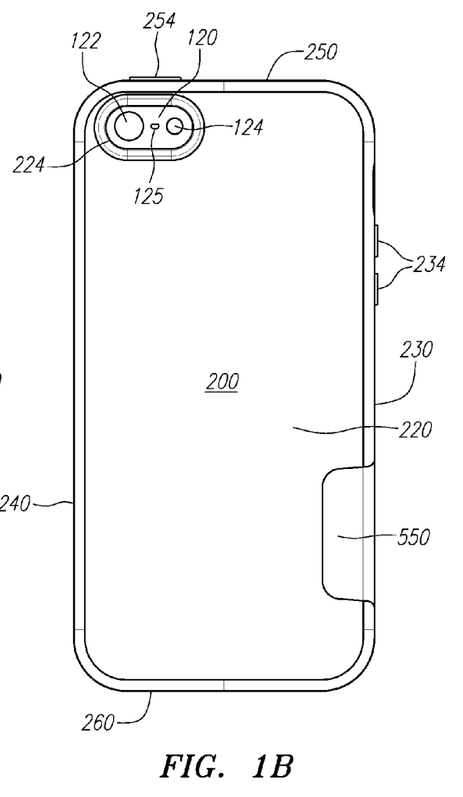
Figure 1C:
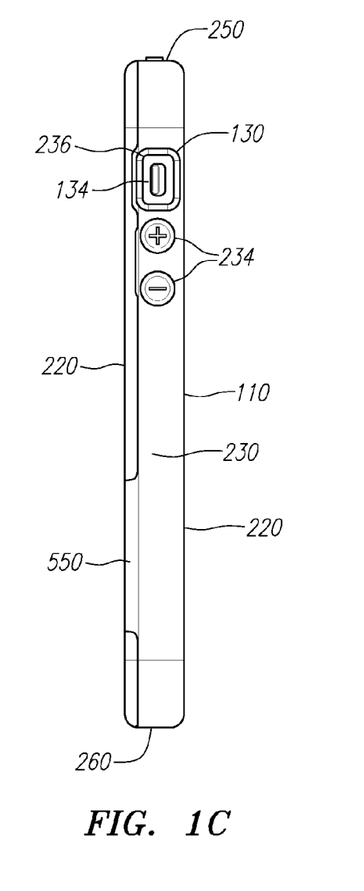
Figure 1D:
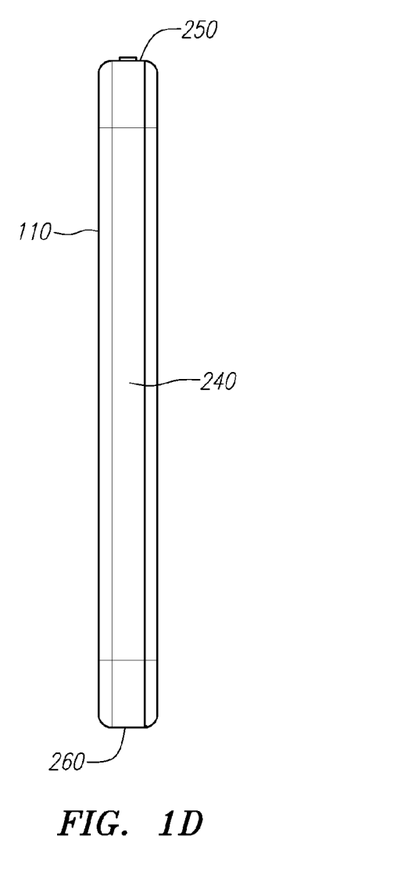
Figure 1E:
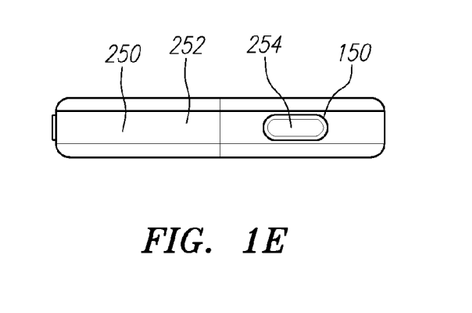
Figure 1F:
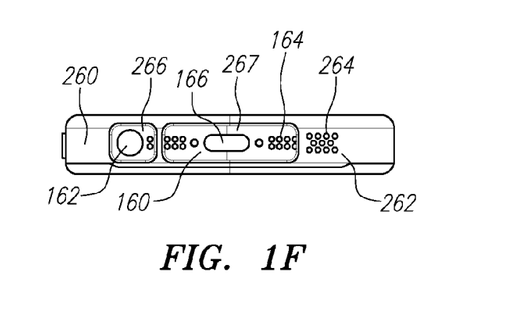
Figure 2A:
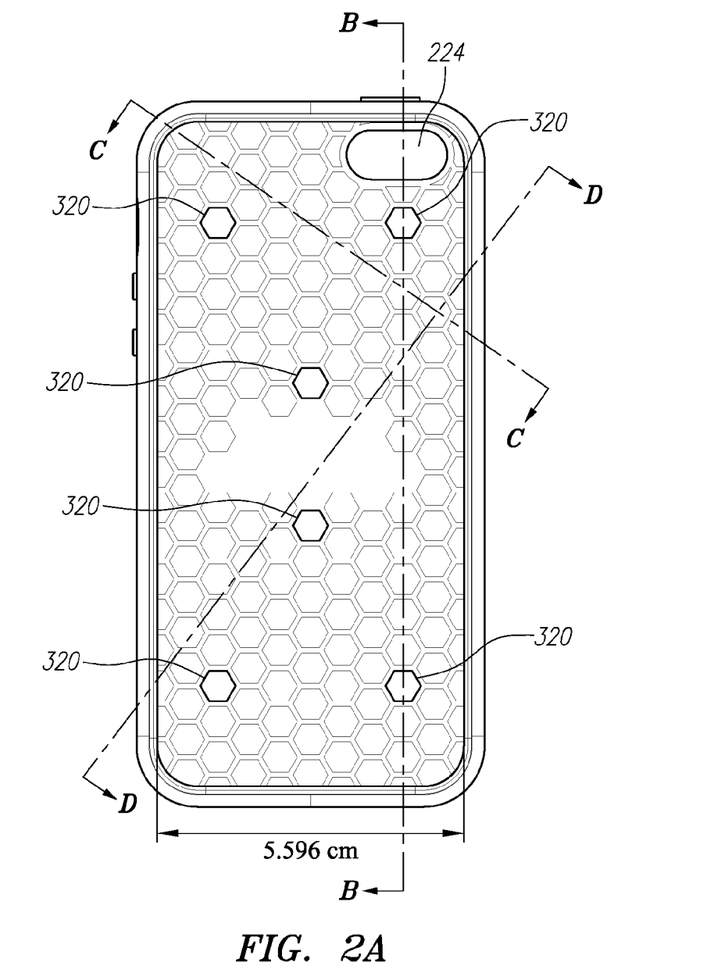
FIG. 2A is a front face view of the protective case illustrated in FIGS. 1A-1F without the mobile device therein.
Figure 2B:
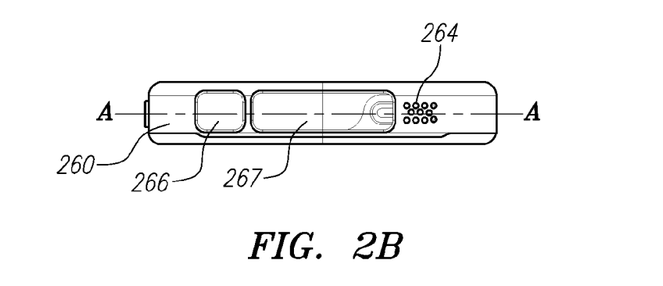
FIG. 2B is a bottom side view of the protective case illustrated in FIG. 2A.
Figure 2C:
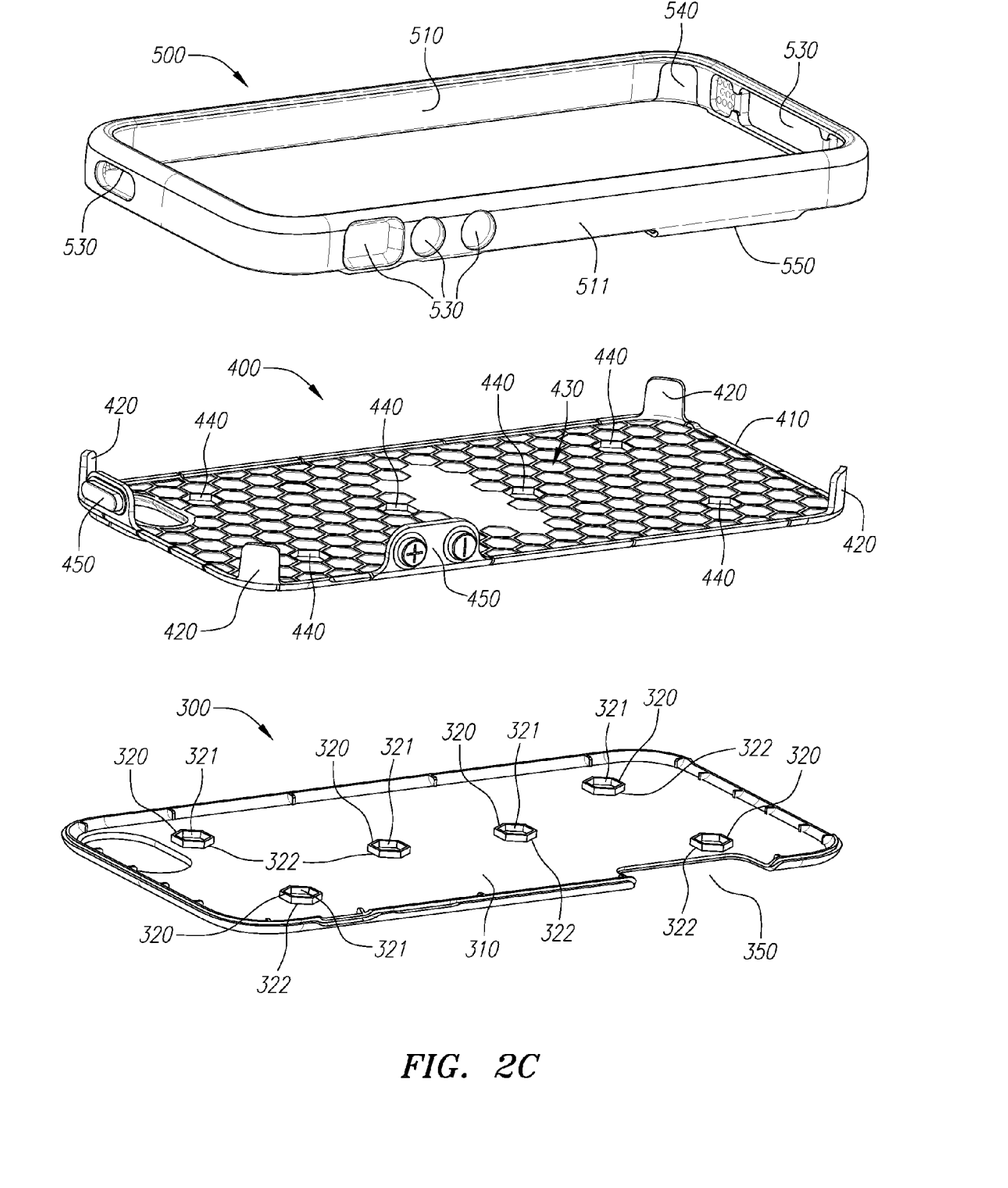
FIGS. 2C-2D are front and back face perspective views, respectively, of the disassembled protective case illustrated in FIG. 2A showing the three component layers of the case. The perspective views are both taken from the left side.
Figure 2D:
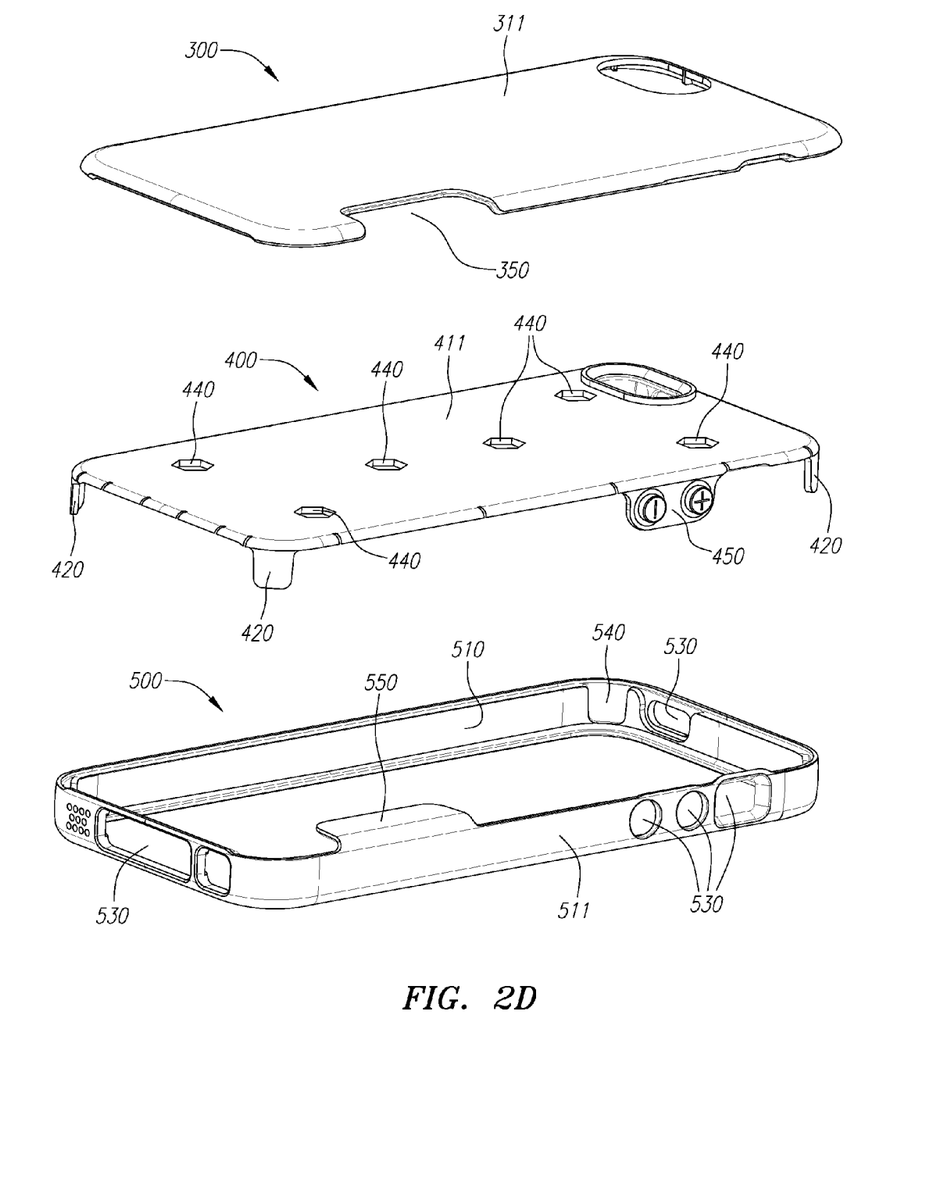
Figure 3:
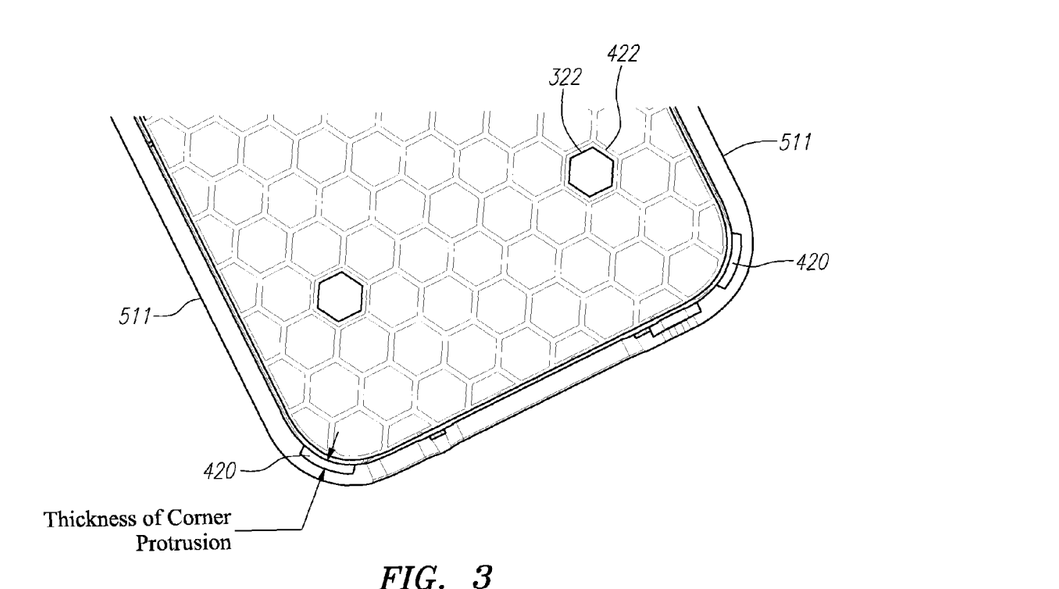
FIG. 3 is a more detailed partial cross-sectional front face view taken along plane A-A of FIG. 2B showing in greater detail the construction of the case at the bottom end region including the corners and sides thereof and the relationship and configuration of the three integrated component layers.
Figure 4:
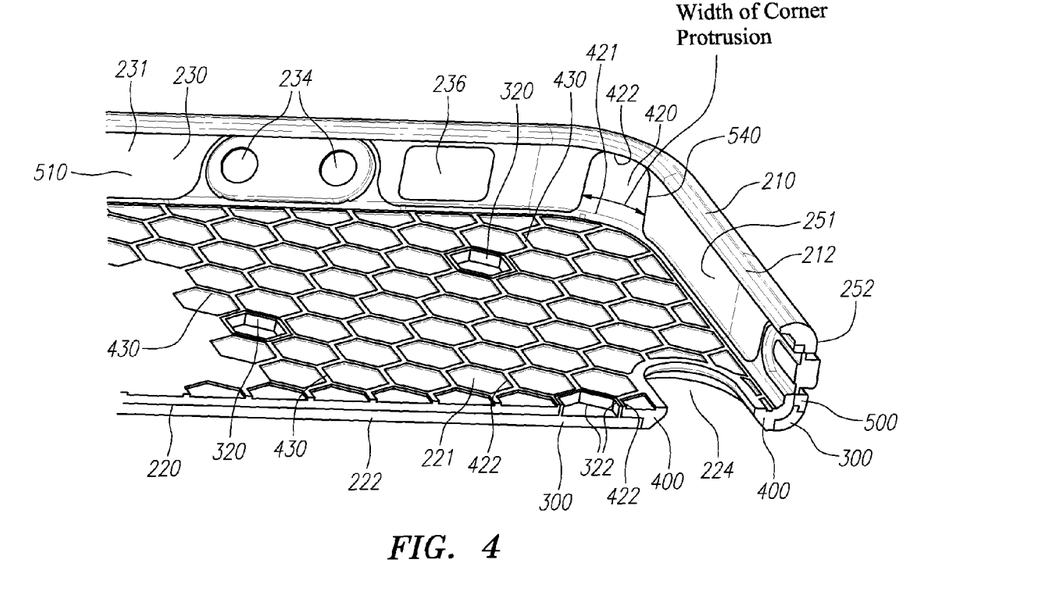
FIG. 4 is a more detailed partial cross-sectional view of the protective case illustrated in FIG. 2A taken along cross-section line B-B showing in greater detail the construction of the case and the relationship and configuration of the three integrated component layers.

As best illustrated in FIGS. 2C-2D, the first layer 300 is defined by first inner and outer surfaces 310, 311, respectively, and dimensioned to cover the back face 120 of the mobile device 100. The first layer 300 is configured to extend to the perimeter 170 of the mobile device 100 at the back face 120 boundary, which is the perimeter defined by the intersection of the side walls (e.g., 130, 140, 150 and 160) and the back face 120 of the mobile device 100. The first inner surface 310 includes a first plurality of protrusions 320 (best illustrated in FIGS. 2A and 2C) extending generally in a direction away from the outer surface 311 of the first layer 300.

The second layer 400 is defined by second inner and outer surfaces 410, 411 respectively, and is also dimensioned to cover the back face 120 of the mobile device and extend around the perimeter 170 of the mobile device 100 at the back face 120 boundary. The second layer 400 further includes a plurality of corner protrusions 420 positioned along the perimeter region of the second layer 400 to correspond in location with the corners 180 of the mobile device 100. The corner protrusions 420 are dimensioned to reside at a height that is slightly below the height of the mobile device 100 at the corners 180. However, it is contemplated, that one, some or all of the corner protrusions 420 may extend at, below, or above the height of the mobile device 100 in any combination. The second layer 400 may further include an elevated pattern of interconnected walls 430 extending from the second inner surface 410 a height above and in a direction away from the second outer surface 411. Also included in the second layer 400 is a plurality of apertures 440 extending into the second outer surface 411, such that one or more of the apertures 440 are dimensioned and positioned to surround (e.g., in close proximity and firm contact) one or more of the protrusions 320 of the first layer 300.

The first and second layers 300, 400 may be configured to cover the entire, a majority, half or less than half of the back face 120 of the mobile device 100 and may be configured to extend to or around the entire, a majority, half or less than half of the perimeter 170 of the mobile device 100 at the back face 120 boundary.

In the illustrated implementation, the first layer 300 is configured to cover nearly the entire back face 120 of the mobile device 100, with the exception of the flash and camera lens window aperture 224 and nearly the entire perimeter 170 of the back face 120 with the exception of the tab aperture 350, described in more detail below. It should be understood however, that alternative configurations may be employed. For example, interposed or intervening regions, such as those between the protrusions 320 and/or apertures 440, may be removed from the first and/or second layers 300, 400 while perimeter regions of the first and/or second layers 300, 400 may be maintained. Perimeter regions in the first and/or second layers 300, 400 that reside between one or more of the corners may be removed. Mid-section regions of the layers 300 and 400 may be removed to allow for access to, or user utilization of, user controls, additional touchscreen interface, and/or other device features (e.g., speakers, cameras, lights, microphone, etc.) that are located on the sides walls 130, 140, 150, 160 and/or back face 120 of the mobile device 100.

Additionally, while the pattern of walls 430 in the second layer 400 is illustrated as being interconnected and elevated, it should be understood that the walls may be disconnected at one or more locations or in discrete regions. Also, while the pattern of walls 430 are illustrated as having a generally uniform height or elevation, it should be understood that the walls 430 may have differing heights at discrete regions within the pattern or within or at specific walls or wall segments within the pattern of walls 430.

The third layer 500 is also defined by third inner and outer surfaces 510, 511, respectively. The third layer 500 is generally dimensioned to cover the top, bottom, right and/or left sides 130, 140, 150, 160 of the mobile device 100 and forms the inwardly projecting rim 214 of the front face wall 210. While in the illustrated embodiment, the third layer 500 extends around the entire perimeter of the mobile device 100, it may be configured elsewise. Thus it is contemplated that the third layer 500 may cover the entire, a majority, half or less than half of the top, bottom, right and/or left sides of the mobile device 100 and/or may be configured to extend around less than the entire, a majority, half or less than half of the perimeter 170 of the mobile device 100 in any combination. Thus, for example the third layer may cover the corners of the mobile device alone or may cover the corners of the mobile device with and only a portion of one or more of the sides extending there-between. The third layer 500 includes one or more mobile device 100 control apertures 530 that extend through the layer that are dimensioned and positioned to allow access (or flow through with respect to speakers and the like) to control buttons or ports (e.g., power button 152, volume button 132, ringer silent switch 134, headphone jack 162, microphone grill 164, and data/charging port 166) on the mobile device 100. The third layer also further includes one or more indentations 540 in the third inner surface 510 at regions configured to reside at the corners 180 of the mobile device 100. The indentations 540 are configured to be in the negative image of the corner protrusions or otherwise dimensioned to receive one or more of the plurality of corner protrusions 420 of the second layer 400.

While, the first, second, and third layers 300, 400, 500 may be co-molded to form an integrated construction, it should be understood that it is contemplated that only portions of one or more of the layers may be co-molded, or each of the layers may be separately formed and mechanically attached to one another by clips, snaps or latches between each of the components or between for example the third layer and the first layer. A combination of co-molding and mechanical attachment of the layers or portions thereof may also be employed. In a fully integrated or co-molded construction the case 200 would be properly dimensioned and have sufficient flexibility to allow the user to insert and remove the mobile device 100 without damage to the case 200. When the components are modular or separable from one another, the user may wrap the second layer around the mobile device 100 and then clip the first and third layers in position around the device 100. The clips, snaps or hooks or other mechanical attachments be formed or molded into: (a) two or more of the layers at their perimeter regions, (b) the protrusions 320 and apertures 440 of first and second layers 300, and 400, (c) one or more of the corner protrusions 420 and indentions 540 in the second and third layers 400, 500, (d) the control buttons 234 and corresponding apertures 530 on the second and third layers 400, 500 and/or (e) at any region where two or more layers are in contact or proximity to one another. Thus, a combination of co-molding and/or mechanical attachment of the layers may be employed. One or more of the layers may be adhesively attached or otherwise bonded to one another.

The materials that form the layers may be selected based on their hardness. For example, the first layer 300 may be made of a first material that has a first hardness, the second layer 400 may be made of a second material that has a second hardness that is different from the first layer, and the third layer 500 may be made of a third material that has a third hardness that is different from the first or second hardness. In a preferred implementation, the first hardness is greater than the third hardness and the third hardness is greater than the second hardness.

The first, second and third layers 300, 400, 500 may be formed of a composition comprised of one or more materials including but not limited to polycarbonate; thermoplastic urethane (TPU), thermoplastic elastomer (TPE), acrylonitrile butadiene styrene (ABS), nylon, metal, silicone rubber, or any combination thereof. For example, the first layer 300, which is the hardest of the three layers, may be formed of a composition comprised of polycarbonate, a combination of polycarbonate and ABS, nylon, fiber reinforced plastic, and/or metal. The second layer 400, which is the softest or least hard of the three layers, may be formed for example of a composition comprised of TPE, silicone rubber, or combination thereof or other suitable materials. The third layer 500, which has a hardness between the other two layers, may be formed, for example, of a composition comprised of TPU and/or TPE or combination thereof or other suitable material. The second layer may be an elastic material.

The first layer 300 may have a Shore A durometer hardness that is 50% or more greater than the third layer 500, 40% or more greater than the third layer 500, 30% or more greater than the third layer, 20% or more greater than the third layer, or 10% or more greater than the third layer all +/−5% as measured using the American Society for Testing and Materials (ASTM) standard D2240. The first layer may have a Shore A durometer hardness of 100+/−15, 100+/−10, or 100+/−5, or 100 as measured using the American Society for Testing and Materials (ASTM) standard D2240. The second layer 400 may have a Shore A durometer hardness of 45+/−15, 45+/−10, 45+/−5, or 45 as measured using the American Society for Testing and Materials (ASTM) standard D2240. The third layer may have a Shore A durometer hardness of 65+/−15, 65+/−10, 65+/−10, or 65 as measured using the American Society for Testing and Materials (ASTM) standard D2240. The third layer may also, for example, have a Shore A durometer hardness that is 40% or more greater than the second layer, 30% or more greater than the second layer, 20% or more greater than the second layer, or 10% or more greater than the second layer all +/−5% as measured using the American Society for Testing and Materials (ASTM) standard D2240. It should be understood that the three layers may have a Shore A hardness that is comprised of any combination of hardness described above consistent with the teachings herein.

In the illustrated embodiment the protrusions 320 have a hexagonal external and internal shape. However, it should be understood that other shapes may be employed. For example, one or more or all of the plurality of protrusions 320 of the first layer 300 may have a first external shape selected from a group consisting of a square, octagon, pentagon, rectangle, triangle, circle, hexagon, and heptagon. One or more or all of the plurality of protrusions 320 may each include an aperture 321 residing therein that defines an internal shape selected from a group consisting of a square, octagon, pentagon, rectangle, triangle, circle, hexagon, and heptagon. One or more or all of the plurality of protrusions 320 may be dimensioned so that the upper surface 322 to be below, above, or flush with the upper surface 422 height of the interconnected walls 430 of the second layer 400 surrounding the protrusions 320 of the first layer 300. Thus, some or none of the plurality of protrusions 320 may be dimensioned to be flush with the height of the interconnected walls 430 adjacent thereto (as shown in the drawings), some or none of the plurality of protrusions 320 may be dimensioned to be below the height of the interconnected walls 430 adjacent thereto, and some or none of the plurality of protrusions 320 may be dimensioned to be above the height of the interconnected walls 430 adjacent thereto. The plurality of protrusions 320 may be comprised multiple groups of protrusions with each protrusion 320 in each group being equally spaced from one another. The plurality of protrusions may be comprised of a first group configured to reside nearer the top end side 250 than the bottom end side 260, a second group may be configured to reside nearer the bottom end side 260 than the top-end side 250, and a third group may be configured to reside an equal distance from the right and left sides 230 and 240. One or more protrusions may be positioned in each corner region, the mid region and/or nearer the perimeter than the middle of the case.

The number of corner protrusions 420 in the second layer 400 may be selected from a group consisting of two, three, and four (or more if mobile device has more than four) configured to reside at one, some or all of the corners 180 of the mobile device 100 or any combination of corners thereof. For example, one corner protrusion 420 may be configured to reside at a corner 180 defined in part by the top side 150 of the mobile device 100 and another corner protrusion 420 may be configured to reside at a corner defined in part by the bottom side 160. By way of another example, one corner protrusion 420 may be configured to reside at a corner 180 defined in part by the right side 140 of the mobile device 100 and another corner protrusion 420 may be configured to reside at a corner 180 defined in part by the left side 130 of the mobile device 100. By way of yet another example, a first corner protrusion 420 may be configured to reside at a corner 180 defined in part by the top side 150 of the mobile device 100, a second corner protrusion 420 may be configured to reside at a corner 180 defined in part by the bottom side 160, a third corner protrusion 420 may be configured to reside at a corner 180 defined in part by the right side 140, and a fourth corner protrusion 420 may be configured to reside at a corner 180 defined in part by the left side 130. Corresponding dimensioned corner indentations 540 in the third layer 500 may be provided to engagingly receive one, some or all of the corner protrusions 420. Thus, some or all of the surfaces that define the indentions on the third layer may be in contact with corresponding surfaces of the corner protrusions 420 on the second layer 400. In this respect, the corner indentations 540 may be configured to have a reverse image of the desired shape of the corner protrusions 420.

The corner protrusions 420 may be configured or otherwise dimensioned to reside above, below or flush with the height of the mobile device 100, in any combination. For example, one of the corner protrusions 420 may be configured to extend above the height of the mobile device 100 and another of the corner protrusions 420 may be configured to be flush with the height of the mobile device 100. Alternatively, all of the corner protrusions 420 may be configured to be flush with the height of the mobile device 100 or may be configured to reside below or above the height of the mobile device 100. The corner protrusions 420 may also have uniform or varying dimensions in width (best illustrated in FIG. 4) and thickness (best illustrated in FIG. 3) between the base 421 and the apex 422 of the corner protrusion 420. For example, the corner protrusions 420 may include a thickness defined between the inner and outer surfaces that varies with the height (as measured from the base 421 to the apex 422) of the protrusion 420, such as being thicker (or thinner) at the base 421 of the corner protrusion 420 as compared to the thickness nearer the apex 422 of the corner protrusion 420. By way of another example, the width, which is generally perpendicular to the thickness, may be wider (or narrower) at the base 421 of the corner protrusion 420 as compared to width near the apex 422 of the corner protrusion 420. For example, in the illustrated embodiment the thickness of the corner protrusions at the apex is 1.09 millimeters and at the base is 1.14 millimeters.

In the illustrated embodiment the pattern of elevated interconnected walls 430 employ a repeating hexagonal external and internal shape. However, it should be understood that other shapes may be employed. For example, the pattern of elevated interconnected walls may be comprised of any pattern including any arrangement of shapes such as a square, octagon, pentagon, rectangle, triangle, circle, hexagon or heptagon or combination thereof. It is also contemplated that the walls may be arranged in a random pattern. It is also contemplated that the walls 430 may have a greater density in number or composition in one region versus another. For example an increased or decreased density (either in composition or in number of the walls) may be employed around or near apertures.

In the illustrated embodiment, the interconnected walls 430 are oriented into hexagonal formations (or portions of a hexagonal formation) that together create a honeycomb wall pattern. The honeycomb pattern may be uniform or non-uniform. The apertures 440 in the second layer 400 and the plurality of protrusions 320 of the first layer 300 have corresponding hexagonal shapes that are dimensioned to snugly mate together, so that one, some or all six of the hexagonal walls are in contact with one another. The pattern of elevated interconnected walls 430 may, as previously noted, be contiguous or dis-contiguous, and may or may not extend to the perimeter regions of the second layer 400, may be positioned in discrete regions, or may be spaced apart from one another. Various patterns comprising one or more shapes may be employed alone or in combination with other patterns. The elevated pattern of interconnected walls 430 may be configured in height and construction so as to suspend the back face of the mobile device above the apertures 321 defined by one or more of the interconnected walls 430 so that the back face 120 of the mobile device 100 does not bottom-out on the recessed inner surface 410 of the second layer 400.

The second layer 400 may further comprise one or more button protrusions 450 that are dimensioned and configured to extend within one or more of the control apertures 530 of in the third layer 500. Each button protrusion 450 may or may not be co-molded to the corresponding control aperture 530 to form an integrated region therewith. The button protrusions are generally configured to reside above a user control button on the mobile device 100 such as a volume 132, power 152, mute, or other user buttons.

The third layer 500 may also further include one or more retention or stability tabs 550 configured to extend underneath the back face 120 of the mobile device 100. The inner surface of the tab may be in contact with the outer surface of the second layer, while the outer surface of the tab may be exposed externally. The tab 550 may be received within an aperture 350 on the first layer 300 that opens to the perimeter. The tab and aperture 550 and 350 may be configured to reside nearer one end of the mobile device 100 than the other and may be configured to reside nearer to one side of the mobile device than the other.

The third layer 500 may also be configured to include retention rim 214 positioned to reside over the perimeter region 170 of the front face 110 of the mobile device 100 to assist in retaining the mobile device 100 within the case 200. The retention rim 214 may encircle a portion or the entire front face 110. For example the retention rim 214 may be configured to extend at the top, bottom, left and/or right sides (at the corners or along the sides thereof) of the mobile device in any combination thereof.

The case 200 is configured and constructed with sufficient flexibility to allow the user to install and remove the mobile device 100 within the case without damaging the case or the mobile device. The flexibility may be implemented via the construction materials employed and the configuration of the layers or components.

A method of manufacturing the protective case 200 for a mobile device is also disclosed. The manufacturing process may include the steps of:

(1) co-molding three layers to form an integrated protective case construct.

(2) molding the first layer defined by first inner and outer surfaces and dimensioned to cover at least a portion of the back face of the mobile device and extend around at least a portion of the perimeter of the mobile device at the back face boundary. The first layer is molded to include a first plurality of protrusions extending from the inner surface of the first layer in a direction away from its outer surface and being molded of a material that is harder than either the second or third layers.

(3) co-molding, around the perimeter regions of the first layer, the third layer defined by third inner and outer surfaces and dimensioned to cover one or more regions of the top-end, bottom-end, right and left sides of the mobile device. The third layer is molded to include one or more control apertures dimensioned and positioned to allow access to control buttons or ports on the mobile device. The third layer being further molded to include indentations in its inner surface at regions configured to reside at the corners of the mobile device, the indentations being dimensioned to receive corner protrusions molded into the second the layer. The third layer being molded of material that is harder than the second layer.

(4) co-molding, onto the inner surface of the first and third layers, the second layer defined by second inner and outer surfaces and dimensioned to cover at least a portion of the back face of the mobile device and extend around at least a portion of the perimeter of the mobile device at the back face boundary. The second layer is molded to include a second plurality of corner protrusions positioned along the perimeter region of the second layer to correspond in location with corners of the mobile device and dimensioned to extend at, below, or above the height of the mobile device. The second layer being further molded to include a pattern of walls extending from its inner surface a height above and in a direction away from its outer surface, and a plurality of apertures that surround and are in contact with one or more of the first group of protrusions in the first layer. The pattern of walls may form any arrangement of shapes selected for example from a group consisting of a square, octagon, pentagon, rectangle, triangle, circle, hexagon and heptagon or combination thereof.

The various aspects relating to configuration and construction of each of the three component layers described above or otherwise herein and/or illustrated in the drawings may be included in the molding process of the layer with any of the foregoing steps, or portions of any of the foregoing steps, in any combination without limitation.

Each of the foregoing and various aspects, together with those set forth in the claims and described in connection with the embodiments of the protective cases summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case for a mobile device configured to be user removable from said mobile device, wherein said mobile device includes a height that is defined as the distance between a front face and a back face of the mobile device, a perimeter defined by top, bottom, right, and left sides residing between the front and back faces, and corners defined at the intersecting regions of the sides, said protective case comprising:
- a first layer defined by first inner and outer surfaces and dimensioned to cover a majority of the back face of the mobile device and extend around a majority of the perimeter of the mobile device at the back face boundary, said first inner surface including a first plurality of protrusions extending in a direction away from said outer surface;
- a second layer defined by second inner and outer surfaces and dimensioned to cover a majority of the back face of the mobile device and extend around a majority of the perimeter of the mobile device at the back face boundary, said second layer further including a second plurality of corner protrusions positioned along the perimeter region of the second layer to correspond in location with a plurality of the corners of the mobile device, said second plurality of corner protrusions being dimensioned to extend at, below, or above the height of the mobile device; said second layer further including an elevated pattern of interconnected walls extending from said second inner surface a height above and in a direction away from said second outer surface, and a plurality of apertures extending into said second outer surface, wherein one or more of said apertures are dimensioned and positioned to at least partially surround and be in contact with one or more of said plurality of first plurality of protrusions; and
- a third layer defined by third inner and outer surfaces and dimensioned to cover at least a portion of the top, bottom, right and left sides of the mobile device, said third layer having one or more control apertures that are dimensioned and positioned to allow access to control buttons or ports on the mobile device; said third layer further having indentations in said third inner surface at regions configured to reside at the corners of the mobile device, said indentations being dimensioned to engage one or more of the second plurality of corner protrusions;
- wherein said first, second, and third layers are co-molded to form an integrated construction and wherein said first layer is made of a first material that has a first hardness, said second layer is made of a second material that has a second hardness, and said third layer is made of a third material that has a third hardness, and wherein said first hardness is greater than said third hardness and said third hardness is greater than said second hardness.

2. The protective case of claim 1, wherein said first plurality of protrusions are dimensioned to be flush with the height of the interconnected walls adjacent thereto.

3. The protective case of claim 1, wherein said first plurality of protrusions are dimensioned to be below the height of the interconnected walls adjacent thereto.

4. The protective case of claim 1, wherein said first plurality of protrusions are dimensioned to be above the height of the interconnected walls adjacent thereto.

5. The protective case of claim 1, wherein some of said first plurality of protrusions are dimensioned to be flush with the height of the interconnected walls adjacent thereto, some of the said first plurality of protrusions are dimensioned to be below the height of the interconnected walls adjacent thereto, and some of the said first plurality of protrusions are dimensioned to be above the height of the interconnected walls adjacent thereto.

6. The protective case of claim 1, wherein a first corner protrusion is configured to reside at a corner defined in part by the top side of the mobile device, a second corner protrusion is configured to reside at a corner defined in part by the bottom side, a third corner protrusion is configured to reside at a corner defined in part by the right side, and a fourth corner protrusion is configured to reside at a corner defined in part by the left side.

7. The protective case of claim 1, wherein the second plurality of corner protrusions include a thickness defined between the inner and outer surfaces, and wherein said the second plurality of corner protrusions is thicker at the base of the corner protrusion as compared to the thickness nearer the apex of the second plurality of corner protrusions.

8. The protective case of claim 1, wherein the second plurality of corner protrusions include a width generally perpendicular to said thickness and wherein said width is wider at the base of the second plurality of corner protrusions as compared to width near the apex of the second plurality of corner protrusions.

9. The protective case of claim 1, wherein said pattern of elevated interconnected walls is comprised of arrangement of shapes selected from a group consisting of a square, octagon, pentagon, rectangle, triangle, circle, hexagon and heptagon.

10. The protective case of claim 1, wherein said pattern of elevated interconnected walls is comprised of hexagonally oriented walls that form a honeycomb pattern.

11. The protective case of claim 10, wherein said apertures in said plurality of apertures are defined by said hexagonal walls and said protrusions of said first plurality of protrusions are hexagonal in shape and dimensioned to be in contact with said hexagonal walls of said apertures.

12. The protective case of claim 1, wherein said second layer further comprises a button protrusion that is dimensioned and configured to extend within one or more of said control apertures of said third layer.

13. The protective case of claim 12, wherein the button protrusion is co-molded to the control aperture to form an integrated region therewith and configured to reside above a volume control button on the mobile device.

14. The protective case of claim 1, wherein said indentations on said third layer are configured to be in contact with said corner protrusions of said second layer.

15. The protective case of claim 1, wherein said third layer further includes a tab that is configured to extend underneath the back face of the mobile device, the tab's inner surface being in contact with the outer surface of the second layer and the tabs outer surface being externally exposed.

16. The protective case of claim 1, wherein said third layer further includes a tab that is configured to extend underneath the back face of the mobile device, the tab's inner surface being in contact with the outer surface of the second layer and the tabs outer surface being externally exposed and wherein said tab is received within a perimeter aperture within said first layer that is configured to reside nearer one end of the mobile device than the other and configured to reside nearer to one side of the mobile device than the other.

17. The protective case of claim 1, wherein said third layer includes retention rim configured to reside over the perimeter region of the front face of the mobile device to retain the mobile device within the case.

18. The protective case of claim 1, wherein said first layer is formed of a composition comprised of polycarbonate.

19. The protective case of claim 1, wherein said second layer is formed of a composition comprised of TPE.

20. The protective case of claim 1, wherein said third layer is formed of a composition comprised of TPU.

21. A method of manufacturing a protective case for a mobile device configured to be user removable from said mobile device, wherein said mobile device includes a front face and a back face with the distance there-between defining the height of the mobile device, a perimeter defined by top, bottom, right, and left sides residing between the front and back faces, and corners defined at the intersecting regions of the sides, said method comprising:
   (a) co-molding three polymer layers within a mold to form an integrated protective case construct;
   (b) molding the first layer being defined by first inner and outer surfaces and dimensioned to cover a majority of the back face of the mobile device and extend around a majority of the perimeter of the mobile device at a boundary of the back face, said first inner surface including a first plurality of protrusions extending in a direction away from said outer surface;
   (c) molding the second layer being defined by second inner and outer surfaces and dimensioned to cover a majority of the back face of the mobile device and extend around a majority of the perimeter of the mobile device at the back face boundary, said second layer further including a second plurality of corner protrusions positioned along a perimeter region of the second layer to correspond in location with a plurality of the corners of the mobile device, said second plurality of corner protrusions being dimensioned to extend at, below, or above the height of the mobile device, said second layer further including a pattern of interconnected walls extending from said second inner surface a height above and in a direction away from said second outer surface, and a plurality of apertures extending into said second outer surface, wherein one or more of said apertures are dimensioned and positioned to closely and firmly surround one or more of said first plurality of protrusions; and
   (d) molding the third layer defined by third inner and outer surfaces and dimensioned to cover a majority of the top-end, bottom-end, right and left sides of the mobile device, said third layer having one or more control apertures there-through that are dimensioned and positioned to allow access to control buttons or ports on the mobile device, said third layer further having indentations in said third inner surface at regions configured to reside at the corners of the mobile device, said indentations being dimensioned to receive one or more of the second plurality of corner protrusions;
wherein the first layer is molded first, the third layer is co-molded second at least in part to the first layer, and the second layer is molded third onto both the first and third layers, and wherein said first layer is made of a first material that has a first hardness, said second layer is made of a second material that has a second hardness, and said third layer is made of a third material that has a third hardness and wherein said first hardness is greater than said third hardness and said third hardness is greater than said second hardness.

* * * * *